No. 868,753. PATENTED OCT. 22, 1907.
J. A. BARRETT.
GAS BROILER.
APPLICATION FILED MAY 31, 1906.
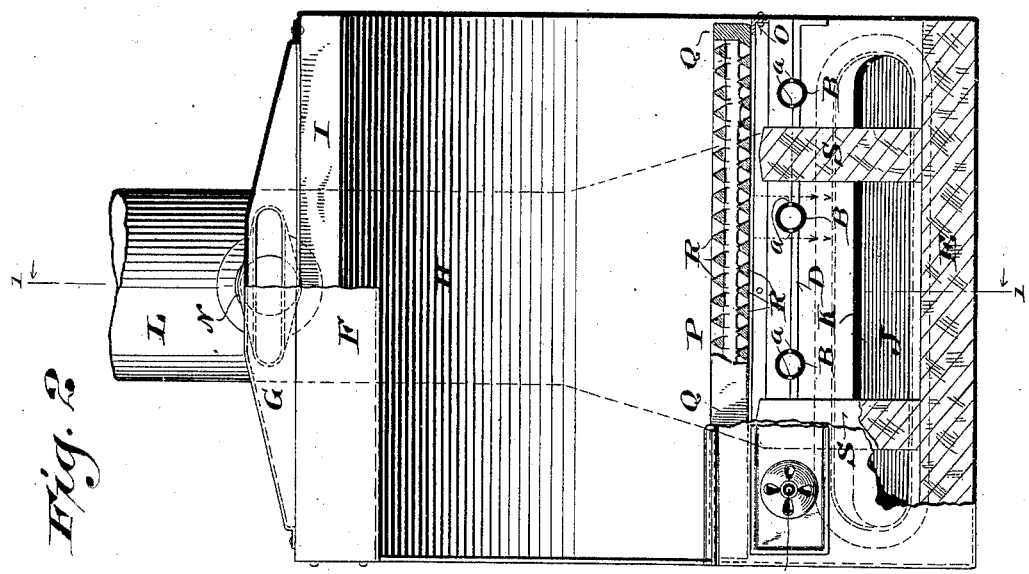
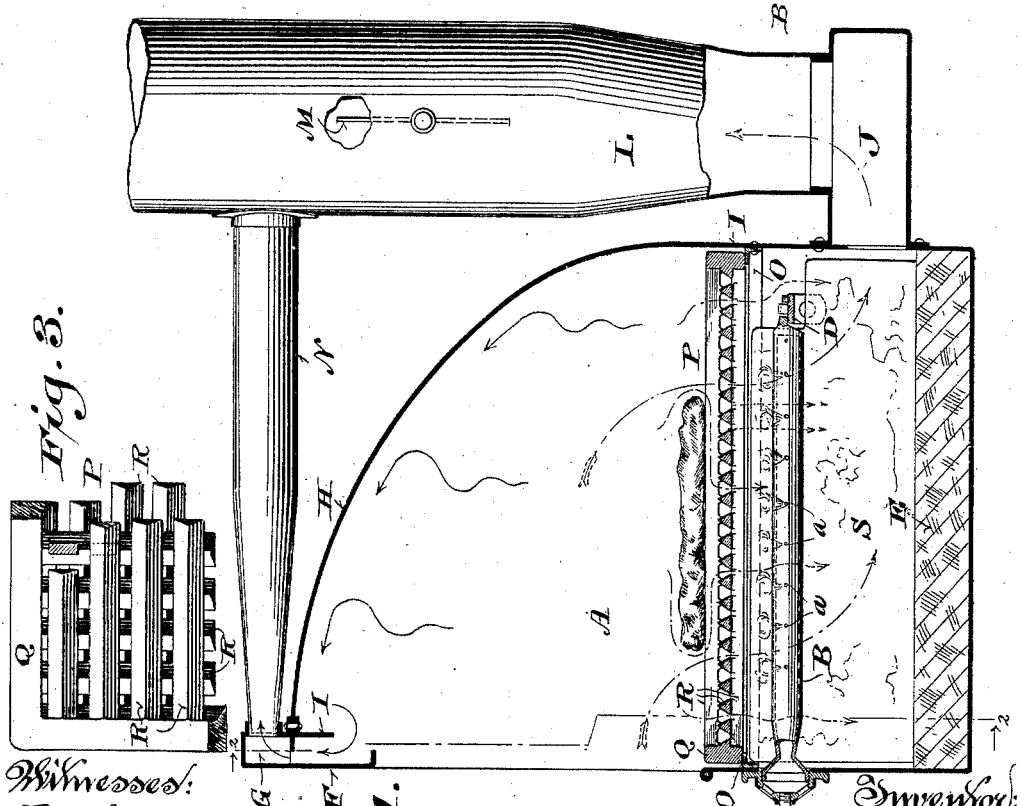
THE NORRIS PETERS CO., WASHINGTON, D. C.

UNITED STATES PATENT OFFICE.

JAMES A. BARRETT, OF MILWAUKEE, WISCONSIN.

GAS-BROILER.

No. 868,753.  Specification of Letters Patent.  Patented Oct. 22, 1907.

Application filed May 31, 1906. Serial No. 319,455.

*To all whom it may concern:*

Be it known that I, JAMES A. BARRETT, a citizen of the United States, and a resident of Milwaukee, in the county of Milwaukee and State of Wisconsin, have invented certain new and useful Improvements in Gas-Broilers; and I do hereby declare that the following is a full, clear, and exact description thereof.

My invention pertains to broilers, wherein gas is employed as fuel, its object being, by the arrangement of gridiron and air draft circulation to produce a simple broiler of this type which will in effect broil similar to a bed of hot coals, thereby overcoming the ill results such as scorching and tainting the articles of food when prepared by the gas-broilers of the type now in use, another object being to increase the intensity of heat by consuming the dripping of combustible matter from the meat in course of preparation. Said invention consisting in certain peculiarities of construction and combination of parts as hereinafter set forth with reference to the accompanying drawings and subsequently claimed.

In the drawings: Figure 1 represents a transverse sectional view of a broiler embodying the features of my invention, the section being indicated by line 1—1 of Fig. 2, Fig. 2, a front elevation of the same partly broken away and in section as indicated by line 2—2 of Fig. 1, and Fig. 3, an enlarged detail plan view of a portion of the gridiron.

Referring by letter to the drawings, A indicates a sheet-metal oven provided with a series of gas-burners B, suitably connected to a gas-supply pipe C, and resting at their rear ends upon a supporting strip D, the said burners being located in a box-like base or chamber of the oven adjacent to the floor thereof, which floor is reinforced by a lining of fire-brick E as shown.

The front wall of the chamber portion of the oven projects slightly above the burners, from which point it is open to a depending deflector plate F that forms part of a trap G, which is secured to a hood H of said oven and extends across its entire width, the inner wall of the trap being provided with a plate I of less depth than the deflector plate, which is secured to the aforesaid hood. The front edge of the oven hood H forms a narrow vent-opening between the deflector plate F that communicates with the trap G above, and said hood from this point is curved backward and downward merging into a straight portion I, that is connected to the bottom and forms the rear wall of the chamber.

A smoke-box J is secured to the rear wall I adjacent to the bottom thereof, to which it communicates through an elongated opening or flue K, located between the fire-brick lining E and burners B, the smoke-box being provided with a pipe L, which carries a damper M and is connected to a suitable source of draft.

The trap G at the apex of the oven-hood is arranged for the purpose of carrying off smoke and odors arising from the produce being cooked, and to this end said trap is connected by a vent-pipe N to the smoke-pipe L, through which the smoke and odors are delivered, it being understood that the vent-opening of the trap is of considerable less area than the flue K and consequently will not interfere with the down draft caused by the location of the latter.

Supported above the gas-burners, upon the angle-strip O secured to the chamber walls, is a gridiron-top P of an area approximately the same as that of said chamber, so that the entire surface thereof may be utilized, and the base of the aforesaid oven in which the burners are located is thus cut off from air, except that which is admitted through the gridiron. The gridiron is preferably cast in one piece and is composed of a rectangular frame Q connected by parallel angle-bars R, suitably spaced apart in series alternately crossed, the upper and lower series being staggered, which together with the intermediate series form a baffle with respect to each other, so as to effectually arrest the jet flame of the gas-burner from coming in direct contact with the article being broiled. The angle-bars R, are preferably, as shown, triangular in cross-section having their flat faces presented toward the flame to increase the surface area at this point, in order that the heat may act quickly, while the spaces between the bars readily admit down draft of air sufficient for perfect combustion. The angle-bars of the gridiron, as shown, are disposed above the gas-burner holes a, in such a manner that the openings between said bars will deflect the grease drippings of meat from said holes and thereby prevent clogging of same.

To break up the down currents of air as they pass to the smoke pipe, and also distribute the heat evenly over the surface of the gridiron, it is found desirable to interpose partitions of fire-brick S between the burners as shown, these partitions extend upward directly under the gridiron and serve to divide the air, as it descends in its travel to the smoke-flue.

In operation, as indicated by the dotted arrows in Fig. 1, air passes downward through the gridiron and commingles with the ignited gas-jets to produce an intense heat, which is absorbed by said gridiron, and also the adjacent fire-brick linings and partitions, to produce a broiling heat, which is intensified by the grease drippings falling through the gridiron to the fire-brick below, and there ignited and consumed. The non-combustible gases and smoke are drawn downward and carried off through the smoke-pipe, so that the meat or other articles being broiled are not affected by contacting therewith, and owing to the baffle of the gridiron bars, said meat is also kept clear of the flame to prevent scorching, any aroma or smoke arising from the meat being caught in the trap above and discharged into the smoke-pipe, as indicated by the full line arrows.

By utilizing a down draft in addition to advantages herein set forth, the intense heat required for broiling will be prevented from rising in the face of the operator at work, and thus avoid the serious discomfitures that would otherwise occur from this source, it being also understood that the superheating by the consumption of the grease not only serves to economize fuel, but at the same time disposes of the grease drippings, thereby dispenses with the necessity of a drip-pan and its unsanitary consequences.

I claim:

1. A gas-broiler having a box-like base or chamber, a grid-top for the chamber, gas-burners in the chamber beneath the grid-top, and a draft-flue in connection with said chamber below the burners, whereby down-draft is had through said grid-top.

2. A gas-broiler comprising a box-like base or chamber, a fire-brick bottom in the chamber, tubular gas-burners located in said chamber, fire-brick partition-walls between the burners, a draft-flue in connection with the aforesaid chamber below the burners, in combination with a gridiron-top for the chamber having parallel spaced bars in series alternately crossed, whereby baffled air-spaces are formed with respect to each other.

3. A gas-broiler having a box-like base or chamber, a grid-top for the chamber comprising two or more tiers of parallel bars alternately crossed, the bars being triangular in cross-section and presenting flat faces to the chamber; gas-burners below the grid-top, and a draft-flue in the chamber below said grid-top, whereby a down-draft is maintained.

In testimony that I claim the foregoing I have hereunto set my hand at Milwaukee in the county of Milwaukee and State of Wisconsin in the presence of two witnesses.

JAMES A. BARRETT.

Witnesses:
  GEO. W. YOUNG,
  FRED PALM.